United States Patent
De Vos et al.

(10) Patent No.: US 6,797,206 B1
(45) Date of Patent: Sep. 28, 2004

(54) PROCESS OF PRODUCING A MICROPOROUS HYDROPHOBIC INORGANIC MEMBRANE

(75) Inventors: Renate Marina De Vos, Wijchen (NL); Hendrik Verweij, Enschede (NL); Benedictus Clemens Bonekamp, Schagen (NL); Petrus Paulus Antonius Catharina Pex, Den Helder (NL)

(73) Assignee: Stichting Energieonderzoek Centrum Nederland, Le Petten (NL)

( * ) Notice: Subject to any disclaimer, the term of this patent is extended or adjusted under 35 U.S.C. 154(b) by 0 days.

(21) Appl. No.: 09/701,175
(22) PCT Filed: May 28, 1999
(86) PCT No.: PCT/NL99/00333
§ 371 (c)(1), (2), (4) Date: Feb. 7, 2001
(87) PCT Pub. No.: WO99/61140
PCT Pub. Date: Dec. 2, 1999

(30) Foreign Application Priority Data

May 28, 1998 (EP) ............................................. 98201783

(51) Int. Cl.$^7$ .............................................. B29D 65/00
(52) U.S. Cl. .......................... 264/45.1; 264/42; 264/43; 264/44; 210/500.25; 210/500.26; 55/523; 55/524
(58) Field of Search ........................... 210/500.25, 490, 210/500.26, 510.1, 506; 55/523, 524; 502/255; 96/6; 95/43, 45, 47; 264/45.1, 41–44

(56) References Cited

U.S. PATENT DOCUMENTS 4,981,590 A  *  1/1991  Van'T Veen et al.
5,169,822 A  *  12/1992  Weissman et al.
5,395,954 A      3/1995  Soria et al.
6,194,650 B1 *  2/2001  Wakayama et al.
6,309,545 B1 *  10/2001  Penth et al.
6,429,275 B2 *  8/2002  McGall et al.

OTHER PUBLICATIONS

Dire, Sandra et al, Unsupported SiO2–based organic–inorganic membranes, Part I.–Synthesis ans structural characterization, J. Mater, 1997, 9(1), 67–73.*

Dire, Sandra et al., Unsupported SiO2–based organic–inorganic membranes, Part 2: surface features and gas separation, J. Mater, 1997, 7(6), 919–922.*

M. Smaihi, "Organic–Inorganic Gas Separation Membranes: Preparation and Characterization", 1996, *Journal of Membrane Science* 116, pp. 211–220, XP–000730132.

L. Interrante, "Chemistry of Advanced Materials", 1998, Wiley–VCH, pp., 406–407, 409, 417–419.

* cited by examiner

Primary Examiner—Ana Fortuna
(74) Attorney, Agent, or Firm—Young & Thompson

(57) ABSTRACT

Microporous hydrophobic inorganic membrane having an average pore size of less than 2 nm and a hydrophobicity index octane/water of at least 2 can be obtained by a process comprising hydrolyzing a metal alkoxide in the presence of a hydrocarbyl metal alkoxide having at least one non-hydrolyzable group in an organic solvent to produce a metal (hydr)oxide sol, and precipitating metal (hydr)oxide from said sol and drying the precipitate. In this process, at least 50% of the amount of hydrocarbyl metal alkoxide is introduced into the solvent after 20% of the hydrolysis period has lapsed.

9 Claims, No Drawings

PROCESS OF PRODUCING A MICROPOROUS HYDROPHOBIC INORGANIC MEMBRANE

The invention relates to a process for producing a microporous hydrophobic inorganic membrane comprising hydrolysing a metal alkoxide in the presence of a hydrocarbyl metal alkoxide in an organic solvent to produce a metal (hydr)oxide sol, and precipitating metal (hydr)oxide from said sol and drying and calcining the precipitate.

Such a process for producing hybrid membranes has been described by Dirè et al, *J. Mater. Chem.*, 1997, 7, 67–73 and 919–922. These authors report the production of unsupported membranes by hydrolysing a mixture of tetraethoxysilane and methyl-triethoxysilane in 70/30, 50/50 and 30/70 ratios at room temperature and at pH 1.5. The resulting sol was allowed to form a gel having a thickness of 10–40 μm and dried. Gas permeation for helium, nitrogen and argon was studied, and a selective permeation of helium to nitrogen was found, depending on the methyl content of the gel membrane. However, the membrane has relatively large pores, the majority of pore diameters being above 2 nm.

An improved method has now been found which results in hydrophobic membranes, both supported and unsupported, having pores sizes in the subnanometer range, and having permeances for small molecules such as $H_2$, $CO_2$, $N_2$, $O_2$ and $CH_4$ and good separation factors for these gasses with respect to larger alkanes such as propane and butane, and for compounds such as $SF_6$. The process of the invention is characterised by a controlled hydrolysis in that the hydrolysis rate of the hydrocarbyl metal alkoxide is taken into account in the rate of sol formation of the metal oxide, by adding a substantial part of the hydrocarbyl metal alkoxide after part of the metal alkoxide has been allowed to hydrolyse. The controlled hydrolysis is defined in the appending claims.

The invention also relates to novel hydrophobic membranes having improved characteristics over the prior art membranes, especially an average pore size (diameter) and/or a majority of pore sizes below 2 nm, or even below 1 nm, and a hydrophobicity index (HI) for octane/water of at least 2, especially at least 2.5 or even 3 or higher. The hydrophobicity index is defined as the ratio of loading of the membrane with hydrophobic substance (octane) to the loading with water as described by Klein and Maier (*Angew. Chem. Int. Ed. Engl.* 35, (1996) 2230–2233; and by Weitkamp et al (*Proc. 9th Intern. Zeolite Conf.* Montreal 1992, Von Balmoos et al Eds. (1993) 79–87). The membranes show high permeances for small molecules, and especially allow separation of small hydrophobic molecules from water or from other hydrophobic molecules, also in the presence of water (humid process streams). Larger molecules such as butane and methyl tert-butyl ether have permeances which are more than 20 times lower than those of the small molecules such as $H_2$, methane, methanol etc.

According to the process of the invention the larger part of the hydrocarbyl metal alkoxide is added after at least 20% of hydrolysis of the metal alkoxide has occurred. The percentage of hydrolysis occurred can roughly be considered equivalent with the percentage of the "normal" hydrolysis period that has lapsed, but more precisely it is the percentage of the total theoretical hydrolysis of metal alkoxide to metal (hydr)oxide. The total amount of hydrocarbyl metal alkoxide used means the total amount added to the hydrolysis system for the purpose of being incorporated into the membrane after hydrolysis. The larger part introduced after at least 20% of hydrolysis is at least 75% of the total amount, but especially essentially the total amount. It is further preferred that a substantial part, especially at least 50%, of the hydrocarbyl metal alkoxide is added only at a later stage, i.e. after at least 50% or even at least 70 or 80% hydrolysis of the metal alkoxide.

The terms metal oxide and metal (hydr)oxide are used interchangeably and denote any oxide, hydrated oxide, hydroxide or mixed oxide/hydroxide of any trivalent or higher-valent element from period 3 and higher periods and groups 3 and higher groups of the periodic table of elements, including e.g. Al, Si, Sc, Ti, V, Ge, Sn, Hf, Ce, as well as combinations thereof such as Si/Ti and Si/Zr.

In the term metal alkoxide as used herein, the metal is defined as above, whereas an alkoxide is understood to comprise the residue obtained by deprotonation of any organic molecule containing a hydroxylic group and an alkyl group; the hydroxyl group may directly be attached to the alkyl group, such as in the methanol, ethanol, propanol, isopropanol, butanol and the like, but also through a carbonyl group as in carboxylic acids (acetic acid, propionic acid and the like); the hydroxyl group may also be an enol tautomer of a ketone, especially a β-diketone or β-ketoester, such as acetyl-acetone (=4-hydroxy-3-propene-2-one). Examples of metal alkoxides include tributoxyaluminium, tetraethoxysilane (TEOS), tetra-isopropoxysilane, tetrabutoxytitanium, tripropoxytitanium acetoacetonate, tributoxytitanium acetate, tetrabutoxyzirconium, tripropoxyzirconium, tetraethoxytin.

A hydrocarbyl metal alkoxide as used herein denotes a compound of a tri- or higher-valent metal as described above with at least one alkoxide group as defined above and at least one hydrocarbyl group which is bound to the metal with a bond which, under normal conditions (temperature below 100° C., pH between 1 and 13), is non-hydrolysable. Such a hydrocarbyl group can be any organic radical containing from 1 to 8 carbon atoms and the corresponding number of hydrogen atoms, such as methyl, ethyl, butyl, isooctyl, phenyl and benzyl. Small alkyl groups, i.e. with 4 or less carbon atoms, especially methyl and ethyl are preferred. Examples include methyl-triethoxysilane (MTES), phenyl-trimethoxysilane, diethyl-dipropoxytitanium, methyl-dibutoxyzirconium acetate, and the like.

The hydrolysis is carried out in an organic solvent such as ethers (tetrahydrofuran, dimethoxyethane, dioxane and the like), alcohols (methanol, ethanol, isopropanol, methoxyethanol and the like), ketones (methyl ethyl ketone and the like), amides etc. Alcohols, such as ethanol, are the preferred solvents. The hydrolysis is carried out in the presence of water and, if necessary, a catalyst. The amount of water to be used depends on the hydrolysis rate of the particular metal alkoxide and hydrocarbyl metal alkoxide, and the volume ratio of water to organic solvent can vary from e.g. 1:99 to 75:25. A catalyst may be necessary if hydrolysis in neutral water is too slow. An acid or a base can be used as a catalyst. For titania and zirkonia sol preparation, a catalyst may not be necessary. For silica sol preparation the conditions as described by De Lange et al. (*J. Membr. Sci.* 99 (1995), 57–75) can be followed. The hydrolysis temperature can be between ambient temperature and the boiling temperature of the organic solvent. It is preferred to use elevated temperatures, in particular above 40° C. up to about 5° C. below the boiling point of the solvent, e.g. up to 80° C. in the case of ethanol.

The drying and/or calcination of the precipitate is preferably carried out under an inert, i.e. non-oxidising atmosphere, for example under argon or nitrogen. The calcination temperature is at least 100° C., up to about 800° C., preferably between 300 and 600° C., using a commonly applied heating and cooling program. The porosity of the membranes can be tuned by selecting the specific metal (hydr)oxide precursor, the appropriate hydrolysis conditions, and the appropriate consolidation parameters (drying velocity, rate and temperature of calcination). Higher temperatures typically result in smaller pore sizes.

Applications of the supported microporous hydrophobic membrane of the invention are especially advantageous in humid process streams, where several problems are encountered by the moisture such as pore blocking and deterioration (e.g. hydrothermal degradation). Furthermore, hydrophobic species can be separated from hydrophobic and hydrophilic ones in liquid separation and gas separation, and especially in pervaporation. Isomer mixtures, such as butene/isobutene and p-/m-/o-xylene can also be efficiently separated into the individual components. Other useful applications are in air cleaning processes for the removal of dust particles or volatile organic compounds without the membrane being blocked by water.

EXAMPLE

1. Standard Membrane Preparation

'Standard' (hydrophilic) silica membranes (Si(400)) were prepared by the sol-gel method for comparison purposes. A silica sol was prepared by catalysed hydrolysis and condensation of TEOS in ethanol. A mixture of acid and water is carefully added to a mixture of TEOS and ethanol under vigorous stirring. The sol solution was prepared by refluxing the mixture at 60° C. for 3 hours. Membranes were made by dipping a supported γ-alumina membrane in a diluted sol solution, followed by thermal treatment (De Vos and Verweij, *J. Membrane Sci.* 143 (1998) 37–51).

2. Hydrophobic Membrane Preparation

In order to make the silica more hydrophobic, methyl-triethoxy-silane (MTES) is incorporated at a certain stage of sol preparation. The hydrolysis/condensation rate of MTES is about 7 times faster than that of TEOS. Therefore a 'standard' silica sol solution preparation was started and MTES was added after at least 6/7 of the usual total reaction time. If MTES was added too fast, hydrolysis and condensation took place for a longer time resulting in bulkier polymers which become visible through light-scattering in the sol solution, which gives rise to larger pores in the membrane (>2 nm).

The complete sol preparation procedure for hydrophobic membranes was as follows: TEOS was mixed with ethanol. A mixture of catalyst (acid) and water was added under vigorous stirring. After the addition was complete, the reaction mixture was heated for 2.75 hours at 60° C. under continuous stirring. This reaction mixture had a molar ratio (based on unreacted components) TEOS/ethanol/water/acid of 1/3.8/6.4/0.085 according to the 'standard' recipe of silica sol preparation (see: De Lange et al., *J. Membrane Sci.* 99 (1995) 57–75). MTES was mixed with ethanol in the ratio of 1/3.8 and the mixture was added to the TEOS reaction mixture after 2.75 h heating. The MTES/TEOS reaction mixture obtained was heated for 15 minutes at 60° C. The mixture then had a molar ratio MTES/TEOS/ethanol/water/acid (based on unreacted components) of 1/1/7.6/6.4/0.085. The reacted mixture was then cooled and diluted 19-fold with ethanol to obtain the final dip solution. After dipping the membranes are calcined at 400° C. for 3 hours in pure nitrogen with a heating and cooling rate of 0.5° C./min. The membranes obtained in this way are referred to below as "MeSi(400)membranes". A similar procedure could be followed using titanium(IV) isopropoxide or titanium(IV) methoxide in combination with MTES as reactants to obtain a hydrophobic Ti/Si system.

3. Unsupported Silica Materials

Unsupported microporous silica material was made by evaporation of 60 ml of the dip solution in a 10 cm petri dish at room temperature, the unsupported silica material being obtained overnight. This was done for both 'standard' sols and sols to which MTES was added, referred to as Si(400) and MeSi(400) respectively. The silica materials were calcined at 400° C. for 3 hours with a heating and cooling rate of 0.5° C./min in air for Si(400) and in pure nitrogen for Me Si(400).

4. Membrane Characterisation

Morphological characterisation of hydrophobic silica membranes is accomplished by Field-Emission Scanning Electron Microscopy (FE-SEM). The FE-SEM recordings revealed a crack-free continuous layer.

Thermogravimetric analysis (TGA) was performed on Si(400) and MeSi(400) unsupported material to obtain a qualitative indication of the amount of hydroxyl groups in the silica material. Both samples were stored at room temperature and normal relative humidity before measurement. The experiments were performed in a pure $N_2$ stream with a water and oxygen content <5 ppm and a heating rate of 1° C./min to 800° C. For the MeSi(400) sample this resulted in the absence of mass release until 500° C., while for Si(400) a decrease in mass at about 100° C. was observed due to the release of physically adsorbed water and above 100° C. due to the release of hydroxyl groups.

The hydrophobicity of the unsupported membrane material was determined by measuring the hydrophobicity index HI=$x_{octane}/x_{water}$ as described by Klein and Maier (see above). The sample was dried first for 12 hours at 250° C. under an Ar stream. After that an Ar stream, containing defined and equal concentrations of water and octane was used to load the sample until saturation at a temperature of 30° C. The breakthrough curves of the individual components were obtained by on-line gas chromatography. Numerical integration of the normalised breakthrough curves provided the loading of water ($x_{water}$) and octane ($x_{octane}$). After correction for the background behaviour of the total reactor, the hydrophobicity index HI was obtained as the ratio $x_{octane}/x_{water}$. The value thus determined for MeSi(400) was 3.0. The comparable value for non-hydrophobised Si(400) membrane was 0.3, so the MeSi(400) material is 10 times more hydrophobic. The hydrophobicity of the MeSi(400) membranes could be made visible by putting a drop of water on the membrane and observing the difference in contact angle. The contact angle was smaller for the Si(400) material.

The presence of methyl groups in the microporous structure was demonstrated with Infra-red spectroscopy. For that, a sample was made of 20 mg of unsupported membrane material plus 200 mg of KBr. The sample was heated under an Ar stream in the IR-cell at 400° C. for 20 hours. The spectra were recorded at 30° C. in the diffuse-reflectance mode. For the MeSi(400) material an additional peak at 1280 cm$^{-1}$ was observed. Such a peak is characteristic for Si—C bonds.

Adsorption isotherms were determined by Ar and $N_2$ adsorption. Ar adsorption was performed at both liquid nitrogen and liquid argon temperature (77K and 87K, respectively). The pore diameter determined for MeSi(400) was about 7Å and for Si(400) it was about 5Å. The pore size distribution for MeSi(400) is larger than for Si(400).

The performance of the membranes was determined by single-gas permeance experiments in a dead-end set-up. Prior to the permeance experiments the membranes were dried at 300° C. under a He stream to remove any moisture from the pore structure of both the γ-alumina intermediate layer and the silica top layer. All characterisations were done for both Si(400) and MeSi(400). The removal of moisture from the pore structure took only 30 minutes for the MeSi(400) membranes, while it takes 3 to 4 hours for the Si(400) membranes. The moisture removed from the MeSi(400) membranes was probably present in the hydrophilic γ-alumina later. Permeance of several gasses at different temperatures are given in table 1.

TABLE 1

Permeances of membranes in $10^{-7}$ mol.m$^{-2}$.sec$^{-1}$.Pa$^{-1}$

| gas | MeSi(400) | | Si(400) | |
|---|---|---|---|---|
| | 100° C. | 200° C. | 100° C. | 200° C. |
| $H_2$ | 23 | 22 | 11 | 17 |
| $CO_2$ | 5 | 4 | 2.9 | 2.3 |
| $O_2$ | 4 | 3.5 | 0.74 | 0.88 |
| $N_2$ | 2.8 | 2.6 | 0.19 | 0.27 |
| $CH_4$ | 2.7 | 2.7 | 0.015 | 0.031 |
| $SF_6$ | 0.01 | 0.01 | 0 | 0 |

What is claimed is:

1. A process for producing an inorganic microporous hydrophobic membrane comprising hydrolysing a trivalent or higher-valent metal alkoxide in a hydrolysis mixture containing an organic solvent, in the presence of a hydrocarbyl trivalent or higher-valent metal alkoxide having at least one non-hydrolysable group, to produce a metal (hydr)oxide sol, and precipitating metal (hydr)oxide from said sol and drying the precipitate, characterised in that at least 75% of the amount of the hydrocarbyl metal alkoxide used is introduced into the hydrolysis mixture after at least 20% of the metal alkoxide has been hydrolysed to metal (hydr)oxide.

2. A process according to claim 1, characterised in that at least 50% of the amount of hydrocarbyl metal alkoxide is introduced into the solvent after 70% of the metal alkoxide has been hydrolysed.

3. A process according to claim 2, characterised in that at least 75% of the amount of hydrocarbyl metal alkoxide is introduced into the solvent after 80% of the metal alkoxide has been hydrolysed.

4. A process according to claim 1, wherein the hydrolysis is carried out at a temperature between 40° C. and the boiling point of the solvent.

5. A process according to claim 1, wherein the metal (hydr)oxide is precipitated onto a porous inorganic support.

6. A process according to claim 1, wherein the molar ratio of metal alkoxide to hydrocarbyl metal alkoxide is from 5:95 to 95:5.

7. A process according to claim 1, wherein the dried precipitate is calcined at a temperature between 100 and 800° C.

8. A process according to claim 1, wherein the metal alkoxide comprises a tetraalkoxysilane, tetraalkoxytitanium, tetraalkoxyzirconium or a mixture thereof and/or the hydrocarbyl metal alkoxide is an alkyltrialkoxysilane.

9. A process according to claim 8, wherein the metal alkoxide comprises tetraethoxysilane and the hydrocarbyl metal alkoxide is methyl triethoxysilane.

* * * * *